March 29, 1932. R. V. HINKLE 1,851,427
AIR FILTER FOR INTERNAL COMBUSTION ENGINES
Filed Feb. 2, 1931 3 Sheets-Sheet 1
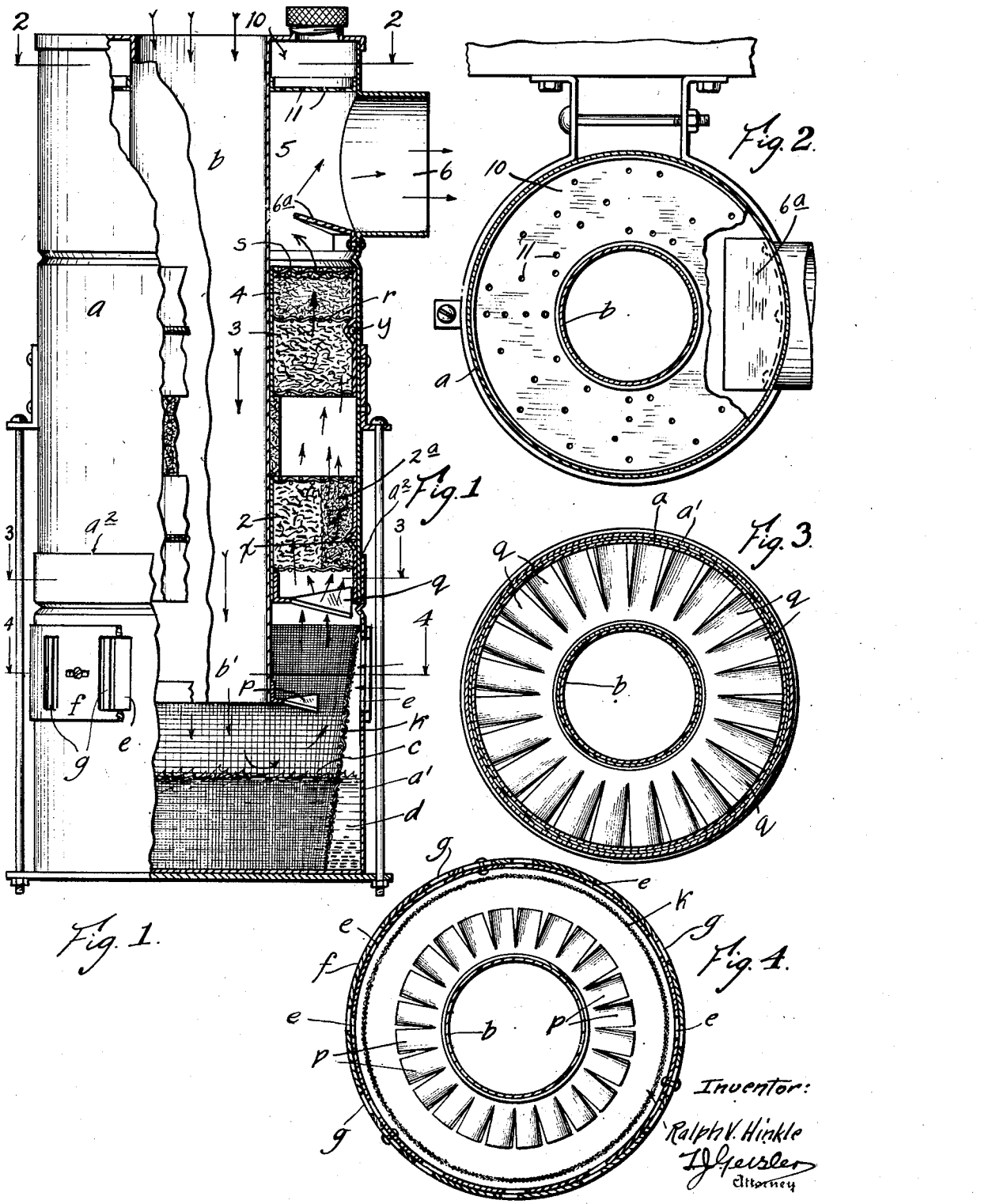

March 29, 1932.  R. V. HINKLE  1,851,427
AIR FILTER FOR INTERNAL COMBUSTION ENGINES
Filed Feb. 2, 1931  3 Sheets-Sheet 2
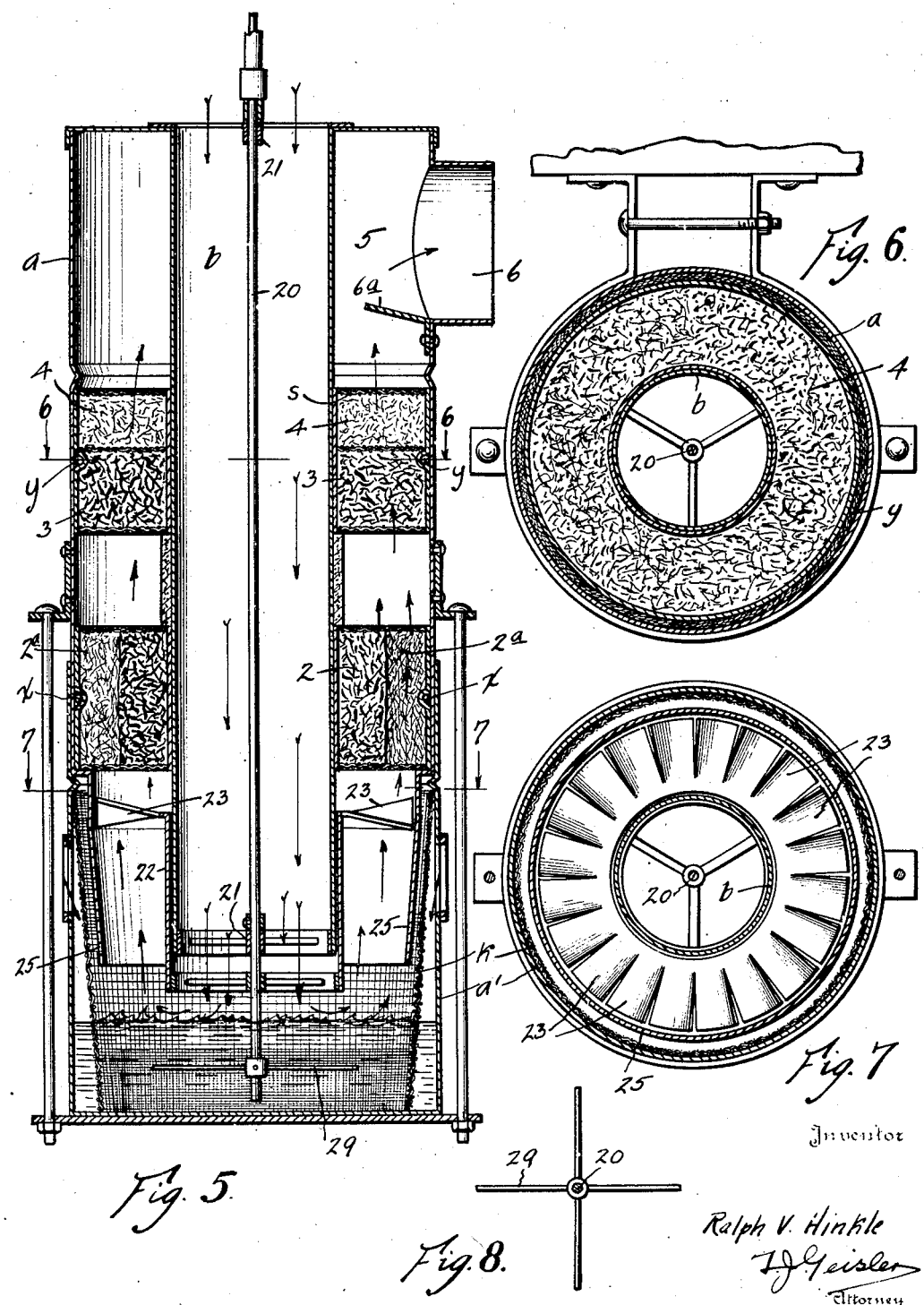

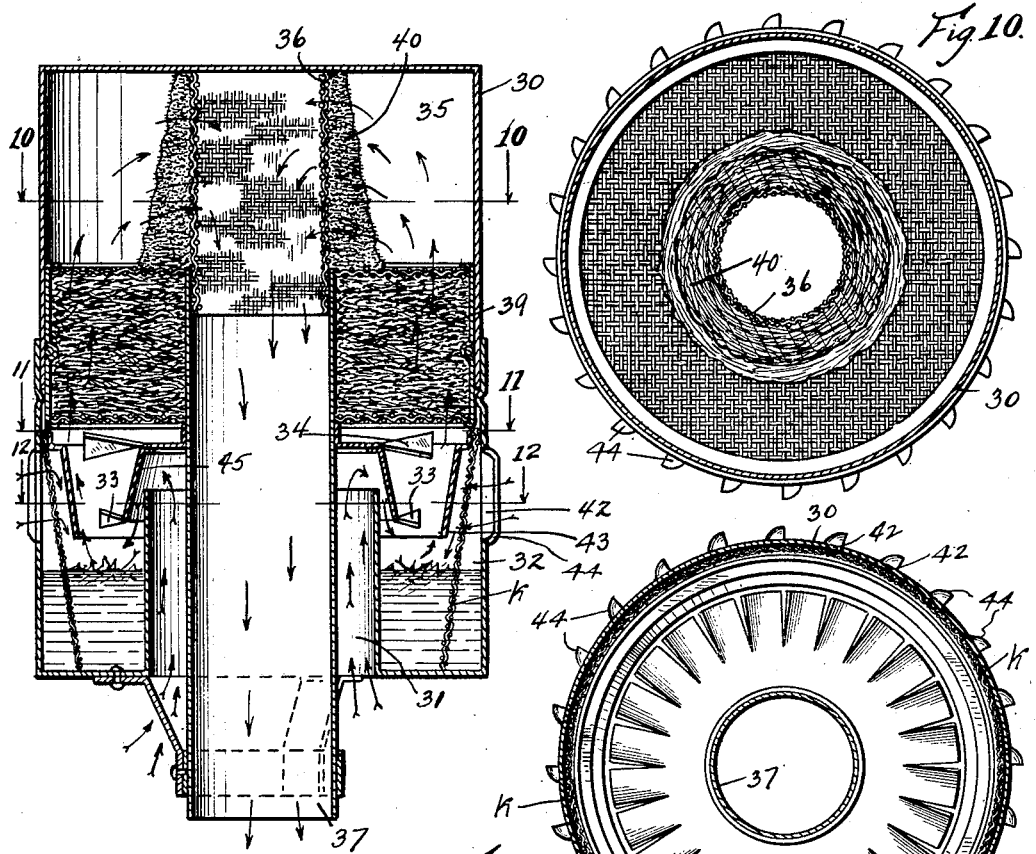
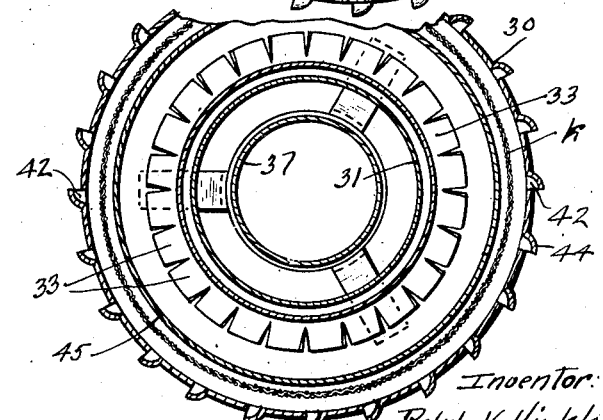

Patented Mar. 29, 1932

1,851,427

UNITED STATES PATENT OFFICE

RALPH V. HINKLE, OF PENDLETON, OREGON

AIR FILTER FOR INTERNAL COMBUSTION ENGINES

Application filed February 2, 1931. Serial No. 512,895.

My invention relates to air filters for the internal combustion engines of motor vehicles and the like.

In such engines it is necessary that means be provided for filtering or cleaning the air of dust which tends to be drawn with the air into the engine of a motor vehicle through the intake manifold and cause imperfect combustion and act as an abrasive on the pistons and cylinders, resulting in excessive wear.

This is especially important in the engines of tractors and the like, used for hauling earth working implements as harrows or scrapers, which throw up great clouds of dust into the atmosphere and if not filtered out before the air is drawn into the engine will soon so reduce the efficiency of the engine as mentioned that the vehicle must be taken out of service and overhauled.

I am aware that devices for this purpose have heretofore been provided, but such devices have not been adapted to operate uniformly at all speeds of the engine, with the result that if the air filter is adjusted for a given speed it tends to prevent the proper volumes of air being drawn into the engine for its efficient operation at other speeds.

Further, in the type of air filters provided with a supplemental liquid washing element, preferably a suitable oil, with which the air is brought into contact and by which it is washed, if such air filter is adjusted for high speeds of the engine, when the greatest volume of air is being drawn through the carbureter then at lower operating speeds when the volume is less, the air will not be brought effectively into contact with the oil.

The reverse is also true, if the filter is adjusted for low speed, then at high speeds when the greatest volume of air is drawn through the air filter excessive quantities of the filter liquid will be picked up and carried into the engine.

This is undesirable, since if the filter liquid is carried into the engine it not only tends to foul the cylinders but also reduces the efficiency of the filter by quickly depleting the supply of filter liquid to a point where it is no longer effective as a washing element.

It is to be noted, however, that it is desirable for the air to pick up minute quantities of the filter liquid, and carry it into the fixed filter elements, usually steel shavings or the like, where it is caught and thus further collects dust from the atmosphere, which may not have been removed by the filter liquid.

Therefore, the object of my invention is to provide an air filter for the internal combustion engines of motor vehicles adapted to remove substantially all the dust and other foreign matter from the air before it is drawn into the engine without restricting or choking the volumes of air required by the engine at any given speed for its efficient operation.

A further object of my invention is to provide an air filter provided with auxiliary means for admitting such additional volumes of air through the carbureter as may be required by the engine at all speeds and thereby so to reduce the force of the suction induced by the engine through the filter as to prevent the latter from picking up and carrying with it excessive amounts of the filter liquid, and the agitation of the filter liquid will result in forming only moderately sized waves, and from which only a desirable, but relatively small quantities of the liquid will be caught up and carried into the filter.

A further object of my invention is to provide an air filter having adjustable means for regulating the additional volumes of air drawn into the air filter according to the requirements of a particular engine.

I attain my objects in an air filter comprising a tubular housing provided with an interior tubular air inlet duct terminating above a predetermined level of said body of liquid, a series of removable filter elements located in said housing above the termination of said inlet duct, the walls of said housing provided with auxiliary air inlets located in said housing above said surface level of said liquid, whereby to admit air from the exterior into said housing to reduce the force of the suction induced and prevent the stream of air drawn over said body of liquid attaining a velocity tending to pick up and carry with it a substantial portion of said liquid.

These and other incidental objects of my invention, the details of construction, and mode of operation are hereinafter fully described with reference to the accompanying drawings:

In the drawings:

Fig. 1 shows an elevation of my air filter partly in section and illustrates the details of construction and relative arrangement of its parts;

Fig. 2 shows a section taken on the line 2—2 of Fig. 1;

Fig. 3 shows a section taken on the line 3—3 of Fig. 1;

Fig. 4 shows a section taken on the line 4—4 of Fig. 1 and illustrates the relative arrangement of the auxiliary air inlets;

Fig. 5 shows a modification of my filter similar to Fig. 1 except that auxiliary means are provided for drawing the air through the filter;

Fig. 6 shows a section taken on the line 6—6 of Fig. 5;

Fig. 7 shows a section taken on the line 7—7 of Fig. 5;

Fig. 8 shows the agitating element for the filter liquid removed from the filter;

Fig. 9 shows a modification of my filter in which the main air inlet duct is located in the lower end of the filter instead of the upper end, as before illustrated;

Fig. 10 shows a section taken on the line 10—10 of Fig. 9;

Fig. 11 shows a section taken on the line 11—11 of Fig. 9; and

Fig. 12 shows a section taken on the line 12—12 of Fig. 9.

With reference now to Figs. 1 to 4: My air filter comprises a tubular, preferably cylindrical, housing $a$ adapted to be attached to the inlet of the carbureter of an internal combustion engine, through which the air is drawn by the suction induced by the engine. The housing $a$ is provided with a downwardly extending, centrally arranged air duct $b$, the outlet or lower end $b'$ of which terminates at a point spaced a substantial distance above the surface level of a filter liquid $c$ contained in the reservoir $d$ in the lower end of the housing.

Auxiliary, circumferentially arranged air inlets $e$ are provided in the side walls of the housing just above the lower end of the air duct $b$ and a collar $f$ having inlets $g$ is rotatably mounted over said air inlets $e$ by which the size of the openings may be varied according to the requirements of the particular engine on which the air filter is mounted.

An annular screen filter $k$ is provided in the reservoir $d$ adjacent the inlets $e$, which slopes downwardly and inwardly into the filter liquid and serves not only to strain or filter the air entering through the said inlets, but also to direct the air downwardly onto the filter liquid, since the air will tend to follow the path of least resistance. Further the current of air entering from the duct $b$ also tends to be thrown against the screen $k$ and also serves to a certain extent to filter the air entering from the latter.

Laterally extending radial vanes $p$ are provided on the lower end of the air duct $b$ which tend to swirl the air and force it away from the exterior wall of the said duct, along which it would normally tend to travel into the screen $k$.

Similar vanes $q$ are provided on the exterior of the duct $b$ above the vanes $p$ to further promote the swirling of the air and force it away from the exterior walls of the duct $b$.

Annular spaced filter elements 2, 3, 4, are provided between the duct $b$ and the housing walls, comprising, preferably, fine steel shavings or the like.

Further, the exterior portion $2a$ of the filter element 2 is finer than the interior portion. This is for the purpose of catching any heavy dirt which might pass the annular screen filter $k$. The portion $2a$ also serves to catch and hold in suspension any wave of oil which might be thrown into contact with it, due to a severe jolt of the motor vehicle, from where the liquid may drain back into the reservoir and will not clog the filter element 2.

The filter element 3 is spaced from the element 2 and is divided from the filter element 4 by a screen $r$. The filter element 4 is finer than the element 3 and is covered by a screen $s$ and provides a graduated filtering of the air, as it were.

Above the filter element 4 is a chamber 5 having an outlet 6 adapted to be attached to the carbureter of the engine.

A baffle $6a$ is provided beneath the outlet 6 to prevent the air from following a direct path through the filter element 4 and causing it to be evenly distributed about the chamber 5.

The filter elements 2, 3, 4 are removable for cleaning or replacement by disconnecting the lower part $a'$ of the housing $a$ as at $a2$ and drawing the filter elements downwardly from the housing. By these means the reservoir $d$ may be removed for cleaning and for replenishing the filter liquid, which is preferably an oil. Sealing rings $x$ and $y$ are provided between the housing walls and the filter elements 2 and 3, respectively, to prevent the tendency of the air to pass between the filter element and wall.

A reservoir 10 is provided in the upper end of the housing $a$ provided with perforations 11 in its bottom, in which clean filter liquid may be provided and permitted to drain into the reservoir $d$, should my filter be attached to a type of engine from which it is difficult to remove the lower part of the housing $a2$ and the reservoir $d$. Further a small amount of valve oil, if desirable, may be provided in the reservoir and permitted to drain into the chamber 5 and be drawn into the engine for lubricating the valves and upper cylinder walls in which case the perforations 11 will be made smaller than in the former instance.

In operation, air is drawn into my filter through the duct *b* and the auxiliary inlets *e* and passes over the filter liquid agitating it and causing the formation of ripples or waves which tend to wash the air. The air as it passes upwardly tends to pick up minute quantities of the filter liquid which are caught by the elements 2, 3, and 4, and by which the remaining dust particles are removed. The air then passes through the outlet 6 to the carbureter with substantially all the dust and dirt removed therefrom.

By these means, the large waves of filter liquid which would normally tend to be created by either the air current from the duct *b* or auxiliary inlets *e* and from which relatively large amounts of liquid would be picked up and carried into and through the filter elements 2, 3, 4, and into the engine, are prevented from forming by the combined currents from the duct *b* and inlets *e* which tend to oppose each other with the result that only moderate waves or ripples are formed and from which only the desirable relatively small quantities of liquid are carried into the filter elements.

Further, by providing the collar *f* for controlling the opening through the auxiliary inlets *e*, the volume of air so admitted may be controlled and the size of the waves created may be regulated according to the type of engine on which it is used, for example, a high speed engine will use greater volumes of air than a low speed engine and hence the currents passing through in the first instance will be stronger and larger waves will be created, which may be reduced by opening the auxiliary inlets wider.

Referring now to Figs. 5 to 8, like parts being indicated by like reference characters with reference to Figs. 1 to 4, I have shown my air filter provided with a driven fan element for accelerating the force of the suction after the air has passed over the filter liquid.

Such means comprise a driven shaft 20 journaled at each end as at 21, longitudinally in the duct *b*. An annular member 22 having radial fan blades 23 is secured to the shaft 20 and rotatable about the duct *b* just above the auxiliary air inlets *e* so that, in case the filter elements create too much interference with the air passing through them, the force of the suction may be accelerated. The lower end of the shaft 20 is extended downwardly into the filter liquid and is provided with radial paddles 29, see Fig. 8, for further agitating the filter liquid.

Further, I provide a downwardly extending baffle 25 in front of the inlets *e* to force the air entering therethrough downwardly onto the filter liquid and by placing the fans 23 above the auxiliary inlets *e*, the acceleration of the force of the suction does not affect the volume of air admitted through them.

In Figs. 9 to 12. I have shown a further modification of my air filter adapted for being mounted on a vertically arranged air inlet pipe provided on certain makes of tractors. To adapt my filter for this purpose, I have provided a housing 30 having an air inlet duct 31 projecting upwardly through the liquid filter reservoir 32, and provided with radial blades or vanes 33, 34, and an annular filter element 39. A chamber 35 is provided in the upper end of the housing in which a tubular screen 36 is provided serving as an extension of an outlet duct 37 extending downwardly through the housing and the inlet duct 31. A canopy-like baffle 45 which supports the radial vanes 33, 34 is provided over the inlet duct 31 to force the air down onto the filter liquid. The lower end of the duct 37 is adapted to be connected to the vertical air intake pipe of an engine in the usual manner.

Auxiliary inlets 42 are provided in the housing above the termination of the inlet duct 31, as before described, except that in this case no means are provided for regulating the areas of the ducts, but they are provided with wings 44 in order to direct the air into the housing in a spiral or swirling path.

Filter material 40 is conically arranged about the screen 36 so that the air instead of flowing directly into the duct 37 near the place where it is joined to screen 36 will, following the line of least resistance, pass upwardly to where the filter material is thinner and will thus be more evenly distributed.

I claim:

1. In an air filter of the character described, a housing, one end of which is adapted to hold a body of liquid, said housing provided with an outlet and an interior air inlet duct terminating above a predetermined level of the said body of liquid, a series of filter elements located in the outlet end of said housing, the walls of said housing provided with auxiliary air inlets located above said surface level of the liquid, whereby to admit air from the exterior into said housing to reduce the force of the suction induced and prevent the stream of air drawn over said body of liquid attaining a velocity tending to cause the stream of air carrying with it substantial portions of said liquid.

2. In an air filter of the character described, a housing, one end of which is adapted to hold a body of liquid, said housing provided with an outlet and an interior air inlet duct terminating above a predetermined level of the said body of liquid, a series of filter elements located in the outlet end of said housing, the walls of said housing provided with auxiliary air inlets located above said surface level of the liquid, means for adjusting the area of said auxiliary air inlets, whereby to admit air from the exterior into said housing to reduce the force of the suction induced and prevent the stream of air drawn over said body of liquid attaining a velocity tending to cause the stream of air carrying with it substantial portions of said liquid.

3. In an air filter of the character described, a housing, one end of which is adapted to hold a body of liquid, said housing provided with an outlet and an interior air inlet duct terminating above a predetermined level of the said body of liquid, a series of filter elements located in the outlet end of said housing, the walls of said housing provided with auxiliary air inlets located above said surface level of the liquid, a supplementary screen element arranged concentrically in said housing between the termination of said air duct and said auxiliary inlets, whereby to admit air from the exterior into said housing to reduce the force of the suction induced and prevent the stream of air drawn over said body of liquid attaining a velocity tending to cause the stream of air carrying with it substantial portions of said liquid.

4. In an air filter of the character described, in combination with a suction element of an internal combustion engine an air feed for said suction element comprising a tubular housing the lower end of which is adapted to contain a body of liquid and provided with an interior tubular air inlet duct terminating above a predetermined level of said body of liquid, a series of removable filter elements located in said housing above the termination of said inlet duct, the walls of said housing provided with auxiliary air inlets located in said housing above said surface level of said liquid, whereby to admit air from the exterior into said housing to reduce the force of the suction induced and prevent the stream of air drawn over said body of liquid attaining a velocity tending to cause the stream of air carrying with it substantial portions of said liquid.

5. In an air filter of the character described, in combination with the carburetor of an internal combustion engine, an air feed for said carburetor comprising a tubular housing the lower end of which is adapted to contain a body of liquid and provided with an interior tubular air inlet duct terminating a substantial distance above a predetermined level of said body of liquid, a series of filter elements located in said housing above the termination of said inlet duct, means for inducing a swirl in the air passing through said filter elements, the walls of said housing provided with auxiliary air inlets located in said housing above said surface level of said liquid, whereby to admit air from the exterior into said housing to reduce the force of the suction induced and prevent the stream of air drawn over said body of liquid attaining a velocity tending to cause the stream of air carrying with it substantial portions of said liquid.

6. In an air filter of the character described, in combination with a suction element of an internal combustion engine, an air feed for said suction element comprising a tubular housing the lower end of which is adapted to contain a body of liquid and provided with an interior tubular air inlet duct terminating above a predetermined level of said body of liquid, a series of filter elements located in said housing above the termination of said inlet duct, the walls of said housing provided with auxiliary air inlets located in said housing above said surface level of said liquid, means for adjusting the area of said auxiliary air inlets, whereby to admit air from the exterior into said housing to reduce the force of the suction induced and prevent the stream of air drawn over said body of liquid attaining a velocity tending to cause the stream of air carrying with it substantial portions of said liquid.

7. In an air filter of the character described, a tubular housing, one end of which is adapted to hold a body of liquid, said housing provided with an outlet and an interior tubular air inlet duct terminating above the predetermined level of said body of liquid, a series of removable annular filter elements located in said housing between the walls of said air duct and the housing, the walls of said housing provided with auxiliary air inlets located above said surface level of the liquid.

8. In an air filter of the character described, a tubular housing, one end of which is adapted to hold a body of liquid, said housing provided with an outlet and an interior tubular air inlet duct terminating above the predetermined level of said body of liquid, a series of annular filter elements located in said housing between the walls of said air duct and the housing, said filter elements of increasing fineness towards the outlet end of the housing, the walls of said housing provided with auxiliary air inlets located above said surface level of the liquid.

9. In an air filter of the character described, a tubular housing, one end of which is adapted to hold a body of liquid, said housing provided with an outlet and an interior tubular air inlet duct terminating above the predetermined level of said body of liquid, a series of annular filter elements located in said housing between the walls of said air duct and the housing, means located in said housing above the termination of said air duct for accelerating the rush of air through said housing, the walls of said housing provided with auxiliary air inlets located above said surface level of the liquid.

10. In an air filter of the character described, a tubular housing, one end of which is adapted to hold a body of liquid, said housing provided with an outlet and an interior tubular air inlet duct terminating above the predetermined level of said body of liquid, a series of annular filter elements located in said housing between the walls of said air duct and the housing, means located in said housing above the termination of said air duct for accelerating the rush of air through said housing, said means including an agitating element located in said liquid, the walls of said housing provided with auxiliary air inlets located above said surface level of the liquid.

11. In an air filter of the character described, a tubular housing, one end of which is adapted to hold a body of liquid, said housing provided with an outlet and an interior tubular air inlet duct terminating above the predetermined level of said body of liquid, a series of annular filter elements located in said housing between the wall of said air duct and the housing, the walls of said housing provided with auxiliary air inlets located above said surface level of the liquid, a supplementary screen arranged concentrically in said reservoir between the termination of said air duct and said auxiliary air inlets and extending downwardly into said liquid.

12. In an air filter of the character described, in combination with a suction element of an internal combustion engine, an air feed for said suction element comprising a tubular housing, the lower end of which is adapted to contain a body of liquid and provided with a primary interior tubular air inlet duct terminating above a predetermined level of said body of liquid, a filter element located in said housing above the terminus of said inlet duct, the walls of said housing provided with an auxiliary air inlet located in said housing above the surface level of said liquid, means for deflecting the air entering from said auxiliary inlet downwardly onto the liquid, whereby to cause the stream of air admitted through said auxiliary inlet to oppose and neutralize the stream of air admitted by said primary inlet and prevent the latter stream of air attaining a velocity tending to cause it to pick up and carry with it substantial portions of said liquid.

RALPH V. HINKLE.